United States Patent [19]
McCloy

[11] Patent Number: 5,740,907
[45] Date of Patent: Apr. 21, 1998

[54] DISK HOLDER

[76] Inventor: Robyn S. McCloy, 565 E. 6400 South, Murray, Utah 84107

[21] Appl. No.: 847,701

[22] Filed: Apr. 28, 1997

[51] Int. Cl.⁶ .................................................. B65D 85/57
[52] U.S. Cl. ........................ 206/307; 206/445; 206/480
[58] Field of Search ........................... 206/307, 307.1, 206/308.1, 308.3, 309, 310, 311, 312, 313, 445–454, 711, 480, 482, 477

[56] References Cited

U.S. PATENT DOCUMENTS

| D. 320,128 | 9/1991 | Fithian . | |
|---|---|---|---|
| 2,917,179 | 12/1959 | Casey et al. . | |
| 4,411,481 | 10/1983 | Berkman | 206/307.1 X |
| 4,630,732 | 12/1986 | Snyman | 206/445 |
| 4,678,245 | 7/1987 | Fouassier . | |
| 4,741,438 | 5/1988 | Mastronardo et al. . | |
| 4,743,156 | 5/1988 | Raffay et al. . | |
| 4,875,743 | 10/1989 | Gelardi et al. . | |
| 4,932,522 | 6/1990 | Milovich . | |
| 5,170,893 | 12/1992 | Smith . | |
| 5,201,414 | 4/1993 | Kaszubinski . | |
| 5,409,108 | 4/1995 | Clausen et al. | 206/308.1 X |
| 5,593,032 | 1/1997 | Staley . | |

*Primary Examiner*—Jacob K. Ackun
*Attorney, Agent, or Firm*—Thorpe, North & Western, L.L.P.

[57] ABSTRACT

A disk holder for holding compact disks, CD-ROM disks, digital video disks, video game disks, and the like is disclosed. The disk holder comprises a base having two walls disposed thereon, the walls spaced apart by a distance sufficient to receive the disk therebetween. The walls contain grooves formed therein for receiving the edges of the disk. One of the walls comprises a series of flexible, finger-like members, each finger bearing a groove such that the finger biases the disk against the opposing wall.

10 Claims, 3 Drawing Sheets

DISK HOLDER

BACKGROUND OF THE INVENTION

This invention relates to an apparatus for holding disks. More particularly, the invention relates to an apparatus for holding compact disks (CD's), CD-ROM (read-only memory) disks, laser video disks, digital video disks, computer game disks, video game disks, and the like such that such disks are held in an organized, convenient, and readily accessible manner. Further, the disks are protected from damage, such as scratches, when held in the apparatus.

Disks of various types are commonly used for storing audio signals, video signals, digital data, and related types of information. Compact disks are most prevalently used as a recording medium for digitally recorded music and have effectively rendered obsolete the use of phonographs for recording. More recently, compact disks have been used as a recording medium for archiving any number and type of documents, such as encyclopedias and databases of compiled information, which can be accessed by CD-ROM hardware. Similarly, laser disks have been used to encode certain information, such as motion pictures and the like. Digital video disks (DVD's) are also being used for recording video and audio signals. These disks are similar to compact disks in geometry and configuration, but are larger in diameter, and possibly other dimensions, than compact disks.

With the increased use of compact disks, laser disks, DVD's, and the like has come the need to store them in a manner that protects them from damage, yet leaves them organized and readily accessible. Several storage means have been suggested in the patent literature, such as are illustrated in U.S. Pat. No. Des. 320,128 to Fithian; U.S. Pat. No. 2,917,179 to Casey et al.; U.S. Pat. No. 4,678,245 to Fouassier; U.S. Pat. No. 4,741,438 to Mastronardo et al.; U.S. Pat. No. 4,743,156 to Raffay et al.; U.S. Pat. No. 4,875,743 to Gelardi et al.; U.S. Pat. No. 4,932,522 to Milovich; U.S. Pat. No. 5,170,893 to Smith; U.S. Pat. No. 5,201,414 to Kaszubinski; and U.S. Pat. No. 5,593,032 to Staley.

The information disk holders described in the patent literature provide adequate means for storing such disks, but typically entail numerous manipulations requiring both hands to remove a disk from or insert a disk into the holder. Many occasions arise when a person desires or needs to access a disk and has only one hand available to remove the disk from the holder. Such occasions can arise, for example, while driving a car. Many other occasions arise when a person may want to access a disk and has only one free hand to do so.

In view of the foregoing, it will be appreciated that providing a disk holder that securely retains such disks therein, that permits the ready removal and insertion of such disks with a single hand; and that allows the multiple retention and stacking of disks in a suitably configured storage means would be a significant advancement in the art.

BRIEF SUMMARY OF THE INVENTION

It is an object of the present invention to provide an apparatus for holding disks, such as information disks.

It is also an object of the invention to provide an apparatus for holding information disks wherein the disks can be removed or inserted with one hand.

It is another object of the invention to provide an apparatus for holding information disks such that the disks are organized and protected from damages, such as scratches.

It is still another object of the invention to provide an apparatus for holding information disks that is simple and inexpensive to fabricate.

These and other objects can be achieved by providing an apparatus for holding an information disk comprising an information-storing surface area and a non-information-storing edge, the apparatus comprising:

a base member;

a first wall disposed on the base member, the first wall having a plurality of substantially linear, substantially parallel grooves disposed therein, the grooves dimensioned for receiving the edge of the disk without contacting the information-storing surface area;

a second wall disposed on the base member such that the second wall is substantially parallel to the first wall, the second wall comprising a plurality of substantially parallel flexible fingers each having a longitudinal axis and having disposed therein at least one groove substantially parallel to the longitudinal axis thereof and to the grooves in the first wall and dimensioned for receiving the edge of the disk without contacting the information-storing surface area;

wherein the second wall is spaced apart from the first wall by a distance sufficient to receive a disk therebetween and for a finger of the second wall to bias the disk against the first wall and thereby hold the disk.

In a preferred embodiment, the first wall is substantially rigid, i.e. not flexible to the pressure exerted by the disk being biased thereagainst. However, in another preferred embodiment, the first wall can also comprise a plurality of substantially parallel flexible fingers each having a longitudinal axis and wherein the grooves are disposed on the fingers and are substantially parallel to the longitudinal axis thereof.

The first and second walls and base are preferably constructed of a material selected from the group consisting of plastic, metal, hard rubber, and wood., with plastic being more preferred. The apparatus can be constructed such that the walls are continuous with the base, or the walls and base can be distinct parts that are attached with screws, adhesive, or other conventional attachment means.

DETAILED DESCRIPTION

Before the present disk holder is disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

It must be noted that, as used in this specification and the appended claims, the singular forms "a," "an," and "the" include plural referents unless the context clearly dictates otherwise. Thus, for example, reference to a disk holder apparatus containing "a wall" includes reference to two or more walls, reference to "a finger" includes reference to one or more of such fingers, and reference to "a groove" includes reference to two or more of such grooves.

In describing and claiming the present invention, the following terminology will be used in accordance with the definitions set out below.

As used herein, "information disk" means a disk used for storing information such as audio signals, video signals, databases, and combinations thereof and the like. Exemplary of such information disks are compact disks, laser disks, digital video disks, vinyl disks, CD-ROM disks, video game disks, and the like.

As used herein, "substantially parallel" means parallel to within a reasonable degree of error that might be introduced and considered acceptable in fabricating the apparatus described and claimed herein.

As used herein, "substantially linear" means linear to within a reasonable degree of error that might be introduced and considered acceptable in fabricating the apparatus described and claimed herein.

As used herein, "finger" means a strip of wall member that resembles a finger in that it has a longitudinal axis significantly longer than the width thereof.

Figure 1:
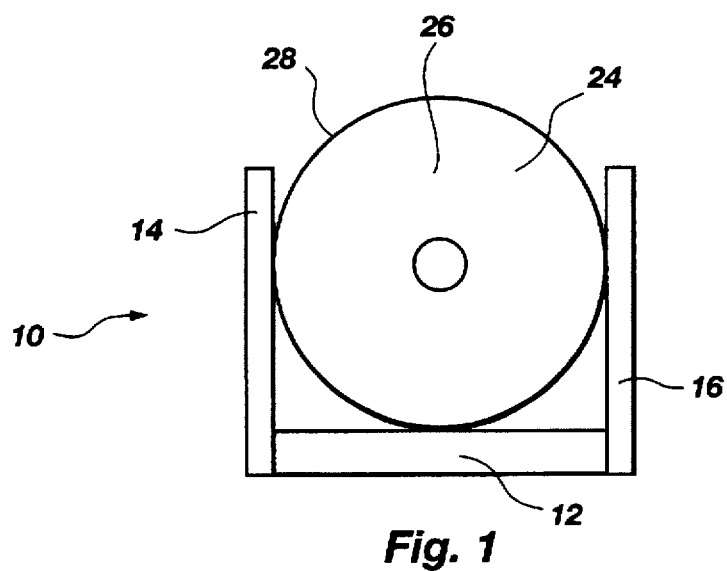
FIG. 1 shows a side elevation view of an illustrative embodiment of the present invention.
Figure 2:
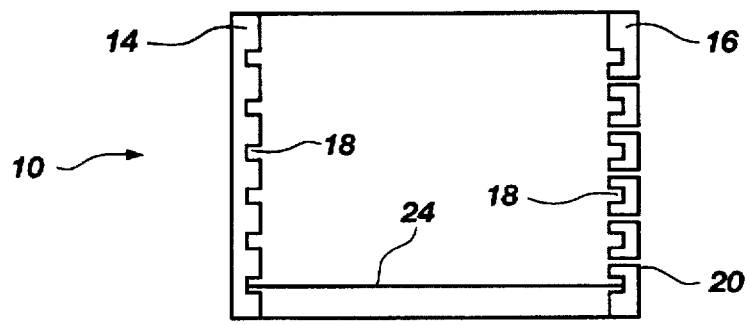
FIG. 2 shows a top view of the illustrative embodiment of FIG. 1 according to the present invention.
Figure 3:
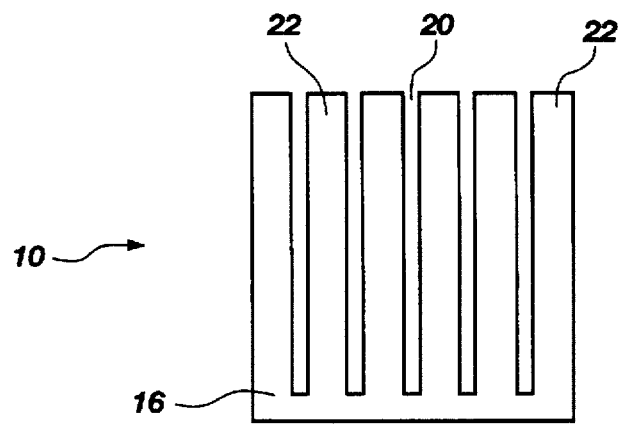
FIG. 3 shows an end view of the illustrative embodiment of FIG. 1 according to the present invention.

FIGS. 1–3 show an illustrative embodiment of the present invention. The device 10 comprises a base 12 on which are disposed two substantially parallel walls 14 and 16. These walls are spaced apart by a distance sufficient for the disk 24 to be received therebetween. It will be apparent to persons skilled in the art that this distance can vary according to the size of the disk being stored. For example, a device for holding compact disks would require a particular distance between the walls for receiving the compact disks, whereas larger or smaller disks would require a larger or smaller distance between the walls for receiving such larger or smaller disks. The distance between the walls can be easily determined without undue experimentation by measuring the diameter of the disk to be stored. Each wall has a plurality of linear grooves 18 formed therein. These grooves are substantially parallel to one another, and each groove in wall 14 is aligned or paired with a corresponding groove in wall 16. Wall 16 has a series of substantially parallel slits 20 running parallel to the grooves such that wall 16 is comprised of a plurality of "fingers" 22. Each finger has at least one groove and preferably only one groove therein. Each finger should have a slight amount of flex such that the finger can act as a spring. Accordingly, the material used for making the wall 16 should be flexible, and any of various plastics well known in the art, i.e. complex organic compounds produced by polymerization and capable of being molded, extruded, or cast into various shapes, would be adequate for constructing the wall. The material for making the base and wall 14 could be any material suitably rigid and durable, such as various plastics, metal, or wood. Plastics are preferred because they are durable and inexpensive.

The information disks are comprised of an information-storing surface area 26 and a non-information-storing edge 28 (see FIG. 1). It is desirable to avoid damaging the information-storing surface area, and thus the information-storing surface area should not be permitted to contact the walls or other parts of the device. Therefore, the grooves should be of a width and depth for receiving the disks and holding them in the device without allowing contact with the information-storing surface area. Such width and depth can be determined by measuring the width of the disk to be stored and the width of the non-information-storing area at the edge of the disk. The grooves can be formed by casting or molding the wall with the grooves formed therein. Alternatively, grooves can be formed by routing grooves to a selected depth and width in a piece of flat stock. Other methods of forming the grooves will be apparent to persons skilled in the art.

The walls can be attached to the base by conventional methods known in the art, such as with screws or adhesives. Moreover, the device can be molded, cast, or otherwise formed from a single piece of material such that the walls are continuous with the base.

The device is used by sliding a disk into the device such that one edge of the disk is received in a groove in wall 14 and a diametrically opposed edge of the disk is received in a corresponding groove in wall 16. The walls are preferably spaced apart such that when a disk is held in a pair of grooves, the finger in wall 16 will be caused to flex outward and thus act as biasing means for biasing the disk against wall 14. The walls can extend vertically from the base, as shown in FIGS. 1–3, or alternatively the walls can extend horizontally from a vertical base.

Figure 4:
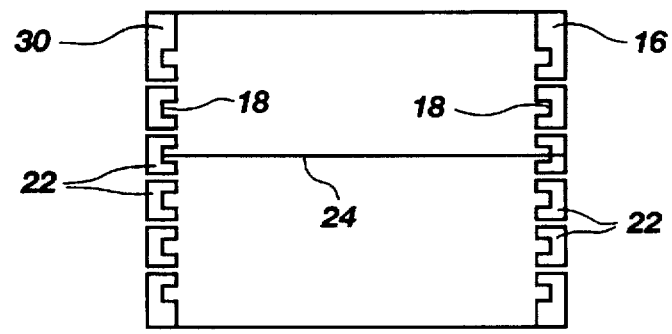
FIG. 4 shows a top view of another illustrative embodiment of the present invention.

In another illustrative embodiment of the invention (FIG. 4), both of the walls 16 and 30 are comprised of fingers 22. In this embodiment, the walls should be spaced apart such that each wall biases the disk against the other wall.

Figure 5:
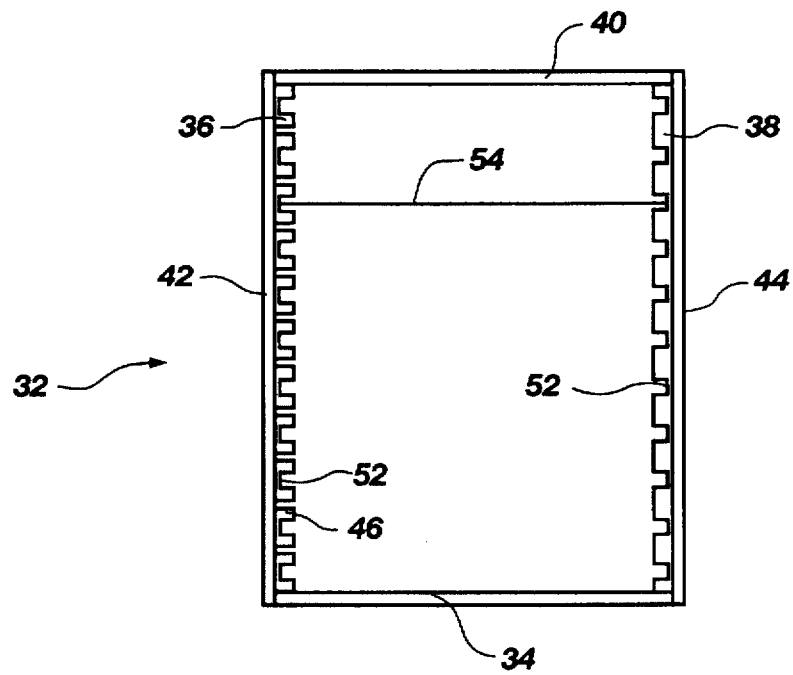
FIG. 5 shows a front elevation view of another illustrative embodiment of the present invention.
Figure 6:
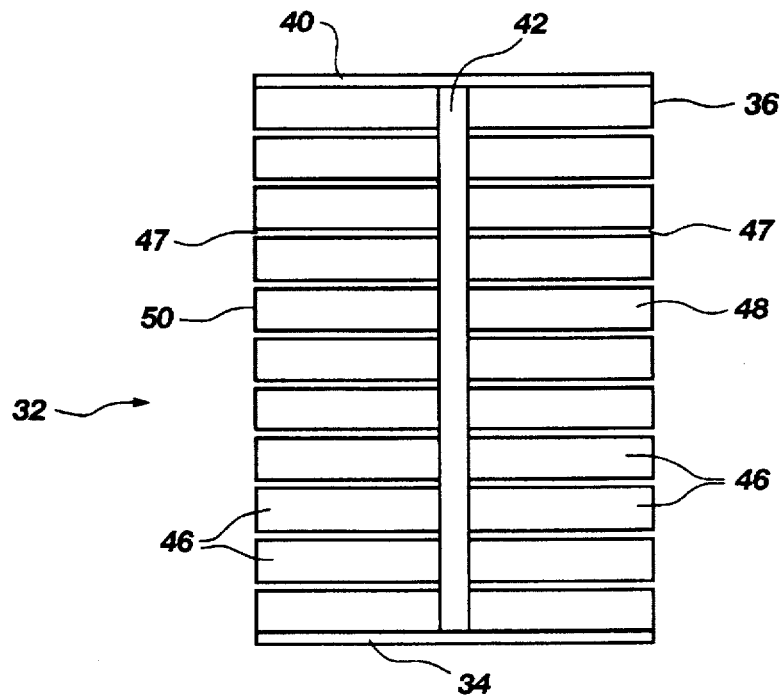
FIG. 6 shows a side view of the embodiment of FIG. 5 according to the present invention.
Figure 7:
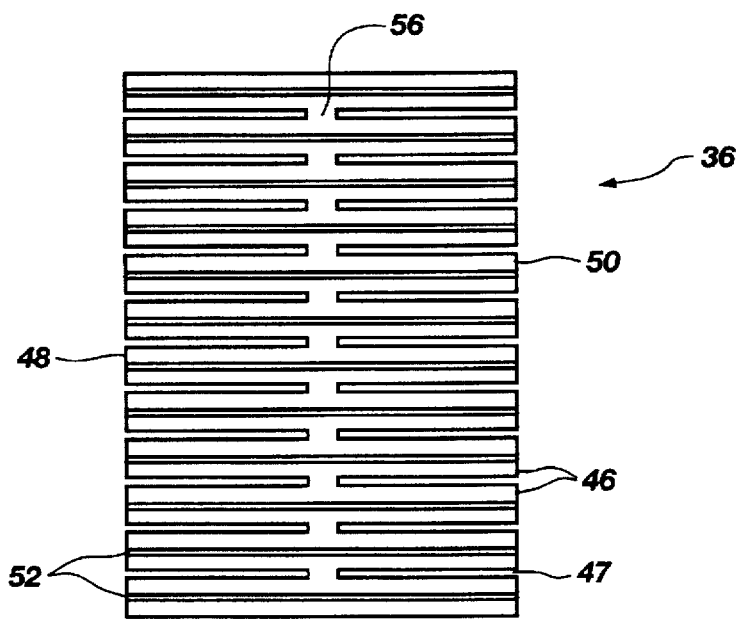
FIG. 7 shows an elevation view of wall 36 of FIG. 5, according to the present invention.

Another illustrative embodiment of the invention is shown in FIGS. 5–7. In this embodiment, the device 32 comprises a base 34 with two upwardly extending walls 36 and 38 disposed thereon. A top member 40 is disposed on the tops of walls 36 and 38 to provide increased strength and stability. Brace members 42 and 44 are disposed on the outside of walls 36 and 38, interconnecting base 34 and top member 40 and further supporting the walls to provide additional strength. Wall 36 is comprised of a plurality of horizontally extending flexible fingers 46. These fingers can be completely separate strips of wall material and held in place by attachment to the brace member 42. In such an arrangement, the fingers are attached to the brace member by any conventional means such as screws or adhesives. Alternatively, the fingers can be formed by cutting slits 47 from both the front 48 and the back 50 such that the slits do not meet and thus the fingers are not separated from each other, but remain interconnected. This is best shown in FIG. 7, which shows the interior or groove-side of wall 36. The wall 36 comprises a core region 56 with fingers 46 extending forward and rearward therefrom. FIG. 7 shows the grooves 52 extending through the core region 56, but the grooves need not extend through the core region because the disks contact the fingers and not the core region.

Grooves 52 are formed in walls 36 and 38 and are dimensioned for receiving the edges of a disk 54, as described above. In this embodiment, the disks lie horizontally in the device. Moreover, disks can be received from the both the front 48 and the back 50 of the device such that 2 disks can be stored at any selected level. As in the device described in FIGS. 1–3, at least one groove is formed in each finger of wall 36, with the groove running substantially parallel to the longitudinal axis of the finger. The walls are spaced apart a distance sufficient for the disks to be received therebetween and for the fingers to bias the disks against wall 38. The materials described for the embodiment of FIGS. 1–3 are also suitable for the embodiment of FIGS. 5–7.

In another illustrative embodiment (not shown), both walls 36 and 38 are comprised of flexible fingers.

The disk holders of the present invention can be placed on a desk top or table top, or can be attached to a wall, door, or other vertical surface.

I claim:

1. An apparatus for holding an information disk comprising an information-storing surface area and a non-information-storing edge, the apparatus comprising:

a base member;

a first wall disposed on the base member, the first wall having a plurality of substantially linear, substantially parallel grooves disposed therein, the grooves dimensioned for receiving the edge of the disk without contacting the information-storing surface area;

a second wall disposed on the base member such that the second wall is substantially parallel to the first wall, the second wall comprising a plurality of substantially parallel flexible fingers each having a longitudinal axis and having disposed therein at least one groove substantially parallel to the longitudinal axis thereof and to the grooves in the first wall and dimensioned for receiving the edge of the disk without contacting the information-storing surface area;

wherein the second wall is spaced apart from the first wall by a distance sufficient to receive a disk therebetween and for a finger of the second wall to bias the disk against the first wall and thereby hold the disk.

2. The apparatus of claim 1 wherein the first wall is substantially rigid.

3. The apparatus of claim 1 wherein the first wall comprises a plurality of substantially parallel flexible fingers each having a longitudinal axis and wherein the grooves are disposed on the fingers and are substantially parallel to the longitudinal axis thereof.

4. The apparatus of claim 1 wherein the first and second walls and base are constructed of a material selected from the group consisting of plastic, metal, hard rubber, and wood.

5. The apparatus of claim 4 wherein the walls and base are constructed of plastic.

6. The apparatus of claim 5 wherein the walls are continuous with the base.

7. The apparatus of claim 1 wherein the walls are attached to the base with screws or adhesive.

8. The apparatus of claim 1 wherein the base lies horizontally, and the first and second walls extend upwardly from the base.

9. The apparatus of claim 8 further comprising a horizontal top member disposed on the first and second walls, wherein the fingers and grooves are horizontally disposed.

10. The apparatus of claim 9 wherein the second wall comprises a core region having horizontal fingers extending forward and rearward therefrom.

* * * * *